United States Patent
Momtaz et al.

(10) Patent No.: US 7,263,151 B2
(45) Date of Patent: Aug. 28, 2007

(54) HIGH FREQUENCY LOSS OF SIGNAL DETECTOR

(75) Inventors: Afshin Momtaz, Irvine, CA (US); Pang-Cheng Hsu, Torrance, CA (US)

(73) Assignee: Broadcom Corporation, Irvine, CA (US)

( * ) Notice: Subject to any disclaimer, the term of this patent is extended or adjusted under 35 U.S.C. 154(b) by 727 days.

(21) Appl. No.: 10/092,166

(22) Filed: Mar. 4, 2002

(65) Prior Publication Data

US 2003/0164724 A1 Sep. 4, 2003

(51) Int. Cl.
*H04L 7/00* (2006.01)
*G01R 29/00* (2006.01)
*H03K 9/08* (2006.01)
*H03L 7/00* (2006.01)

(52) U.S. Cl. .................. 375/371; 375/373; 375/376; 375/354; 327/2; 327/37; 327/141

(58) Field of Classification Search ........ 375/354–376, 375/327; 370/516–519; 327/2, 37, 68, 147, 327/152, 156–159, 161, 205, 141; 398/25, 398/27, 17, 155, 158
See application file for complete search history.

(56) References Cited

U.S. PATENT DOCUMENTS

| | | | | |
|---|---|---|---|---|
| 4,881,243 A | * | 11/1989 | Whitt | 375/215 |
| 5,590,157 A | * | 12/1996 | Schuur | 375/327 |
| 6,115,154 A | | 9/2000 | Antoniades et al. | |
| 6,222,668 B1 | | 4/2001 | Dutrisac et al. | |
| 6,223,185 B1 | * | 4/2001 | Berkland et al. | 707/103 R |
| 6,226,344 B1 | * | 5/2001 | Ten Pierick | 377/20 |
| 6,397,374 B1 | * | 5/2002 | Pasqualini | 716/8 |
| 6,623,185 B1 | * | 9/2003 | Peragine | 398/26 |
| 6,703,880 B1 | * | 3/2004 | Gailhard et al. | 327/159 |

FOREIGN PATENT DOCUMENTS

| | | |
|---|---|---|
| EP | 0 926 854 A2 | 6/1999 |
| EP | 0 930 742 A2 | 7/1999 |

OTHER PUBLICATIONS

Alexander Gilman et al., "Monolithic Clock and Data Recovery Chip for 10Gb/s Fiber Communication Systems," *Final Report 1999-2000 for MICRO Project 99-078*, Industrial Sponsor: Conexant Systems, Department of Electrical and Computer Engineering, University of California, Santa Barbara, California USA.

(Continued)

*Primary Examiner*—Jay K. Patel
*Assistant Examiner*—Linda Wong

(57) ABSTRACT

Methods and circuitry for implementing high speed loss-of-signal detectors for use in Gb/s telecommunication applications. The invention measures bit error rate (BER) of the incoming data by comparing the phase of the clock signal extracted from the incoming data with that of a delayed version of the incoming data. The results of this comparison are averaged over time to arrive at the BER. The measured BER is compared to a predetermined threshold value to detect a loss-of-signal condition. The invention adjusts the amount of delay of the incoming data in such a manner as to minimize the capacitive loading on the data line and clock line introduced by the loss-of-signal circuitry.

10 Claims, 5 Drawing Sheets

OTHER PUBLICATIONS

Richard C. Walker, et al., "A 2.488 GB/s Si-Bipolar Clock and Data Recovery IC with Robust Loss of Signal Detection," *HP Design Conference, Tokyo*, 1997, Hewlett Packard Laboratories, Palo Alto, California USA.

Richard C. Walker, et al., "A 2.488 Gb/s Si-Bipolar Clock and Data Recovery IC with Robust Loss of Signal Detection," *HP Design Conference, Tokyo 1997*, Hewlett Packard Laboratories, Palo Alto, California.

* cited by examiner

HIGH FREQUENCY LOSS OF SIGNAL DETECTOR

BACKGROUND OF THE INVENTION

The present invention relates in general to integrated circuitry, and in particular to methods and circuits for implementing a high frequency loss of signal detector.

In many telecommunication applications the receiver is required to distinguish between bad or corrupted data and valid data. Common causes of bad data include disconnects in the transmission line (e.g., a cut fiber optic cable in an optical network), excessive attenuation of the signal relative to noise or DC offset in the signal path, clock feed-through, or equipment fault. Bit error rate (BER) which is a direct indication of the number of errors in received data during a given time period is commonly used in the industry as a measure of the quality of the received signal. In some applications BER is measured by sending and receiving a known pattern, while other applications measure BER by a line loop-back test method. In order to continuously monitor BER of a received signal, receivers use a statistical loss of signal (SLOS) detector. The SLOS detector measures BER relative to a threshold and indicates a loss-of-signal condition when BER exceeds the threshold.

In a typical receiver, clock is extracted from the incoming data and is used to retime the incoming signal before further processing the data. BER increases when the timing relationship between the extracted clock and the incoming data falls outside the allowed range. For example, the retiming circuitry may require one edge, e.g., the falling edge, of the clock to occur in the middle of the data eye. If the clock falling edge gets too close to the data transition, an error may occur. Jitter and static phase offset are the two main contributors to disturbing the required phase relationship and therefore the increase in BER. Incoming data jitter as well as extracted clock jitter both add to the total jitter, and clock duty cycle distortion as well as clock and data recovery (CDR) and retimer phase offset all add to total static phase offset. The functionality of the SLOS detector can therefore be based on monitoring the phase of the data signal relative to that of the recovered clock signal. A 2.488 Gb/s fiber optic receiver that includes a loss-of-signal detector designed based on this concept is described in "A 2.448 Gb/s Si-bipolar Clock and Data Recovery IC with Robust Loss of Signal Detection," HP Design Conference, Tokyo, 1997,by Walker et al. That implementation, however, relies on a Si-Bipolar process to achieve the required speed of operation for 2.448 Gb/s receiver. The faster Si-Bipolar process and the relatively lower speed of operation relax some of the circuit design constraints. For example, for higher bit rates (e.g., 10 Gb/s or higher) the capacitive loading on the internal data and clock lines becomes far more critical. Because the SLOS circuitry often directly connects to the data input line and the recovered clock line, at higher data rates special care must be taken to minimize the capacitive loading on these lines. It is also desirable to implement the circuit in standard CMOS (complementary metal-oxide-semiconductor) transistor technology which is more cost-effective and has the added advantage of lower power consumption. The CMOS process, however, is a slower process compared to Si-Bipolar or other more complex processes such as SiGe or GaAs. Furthermore, the SLOS signal is often used to immediately initiate remedial action such as rerouting of signal traffic to a redundant cable, or adjusting the phase or threshold levels in certain internal circuitry, and the like. Such remedial actions are often disruptive and have undesirable side-effects. For overall system reliability, therefore, it is desirable that the SLOS detector operate reliably.

There is therefore a need for a loss-of-signal detector that can operate reliably at ultra-high data rates and can be implemented without requiring special processing technologies.

BRIEF SUMMARY OF THE INVENTION

The present invention provides methods and circuitry for implementing high speed loss-of-signal detectors for use in Gb/s telecommunication applications. The invention measures BER by comparing phase of the clock signal extracted from the incoming data with that of a delayed version of the incoming data. The results of this comparison are averaged over time to arrive at the BER. The measured BER is compared to a pre-determined threshold value to detect a loss-of-signal condition. The invention adjusts the amount of delay of the incoming data in such a manner as to minimize the capacitive loading on the data line and clock line introduced by the loss-of-signal circuitry. In one embodiment, a flip-flop latches the recovered clock signal in response to delayed data to determine their timing relationship. In an exemplary implementation, the data is delayed by one quarter of the clock period resulting in a symmetrical window of error on either side of the half-period transition of the clock. This enables the detection of an error on either sides of the half-period using a single flip-flop. According to this embodiment of the invention, therefore, the loss-of-signal detector only adds the capacitive loading of a single flip-flop to the recovered clock line, while it capacitively loads the data line by no more than the delay circuit.

Accordingly, in one embodiment, the present invention provides, in a receiver that includes a clock recovery circuit that extracts a recovered clock signal from an incoming data signal, a loss-of-signal detector including: a delay circuit coupled to receive the incoming data signal and configured to shift a phase of the incoming data signal by a predetermined delay to generate a delayed data signal; a flip-flop coupled to receive the recovered clock signal at one input and the delayed data signal at a clock input; an integrator coupled to an output of the flip-flop; a switch coupled to the integrator and configured to reset the integrator; and a comparator having a first input coupled to an output of the integrator and a second input coupled to a threshold voltage. The delay circuit is configured to shift the phase of the incoming data signal in a manner that is symmetrical with respect to the clock signal half-period. In a specific embodiment, the predetermined delay is substantially equal to one quarter of the clock signal period.

In another embodiment, the present invention provides a high speed receiver including a clock and data recovery block coupled to receive an incoming data signal and configured to extract a recovered clock signal from the incoming data signal; a retiming circuit coupled to receive the incoming data and the recovered clock signal and configured to generate a retimed data signal for further processing; and a statistical loss-of-signal (SLOS) detector coupled to receive the recovered clock signal and the incoming data signal, and configured to measure a bit error rate of the incoming data signal and to detect a loss-of-signal condition, wherein the SLOS detector is configured such that it adds as capacitive loading a single flip-flop to the recovered clock signal and a delay circuit to the incoming data signal.

In yet another embodiment, the present invention provides, in a receiver that includes a clock recovery circuit that extracts a recovered clock signal from an incoming data signal, a method for detecting statistical loss of signal, the method including: delaying the incoming data signal by one quarter of the recovered clock signal period to generate a delayed data signal; latching the recovered clock signal using the delayed data signal as clock to generate an error signal; integrating error signals over a predetermined period of time to arrive at a bit error rate of the incoming data signal; and comparing the bit error rate with a predetermined threshold to detect a loss-of-signal condition.

The following detailed description and the accompanying drawings will provide a better understanding of the nature and advantages of the high speed statistical loss-of-signal detector according to the present invention.

BRIEF DESCRIPTION OF THE DRAWINGS

The following detailed description uses the same reference numerals to refer to the same blocks and elements that may appear in different figures.

DETAILED DESCRIPTION OF THE INVENTION

The coming of the modern information age has brought about phenomenal growth in demand for telecommunications-based services and products, driven primarily by the Internet. As the burgeoning expansion of the Internet continues along an unprecedented and unpredictable path, many new applications are foreseen and expected. These applications are placing increasing demands for ultra-high speed circuit solutions. In parallel, driven by the explosive growth in bandwidth requirements of multimedia applications, various ultra-high bit rate transmission techniques have been developed. Fiber-optic communications system speeds have increased from asynchronous-transfer-mode (ATM) rates of 155 Mb/s and synchronous optical network (SONET) rates of 622 Mb/s to the optical carrier (OC) standard of OC-192 at 10 Gb/s and OC-768 at 40 Gb/s. Realizing such high speeds in standard CMOS process technology presents serious challenges to the circuit designer. This speed bottleneck requires that the capacitive loading on the incoming data line and the extracted clock line be minimized. The amount of loading presented by conventional SLOS detector circuitry would be unacceptable in the 10 GHz and above frequency range.

Figure 1:
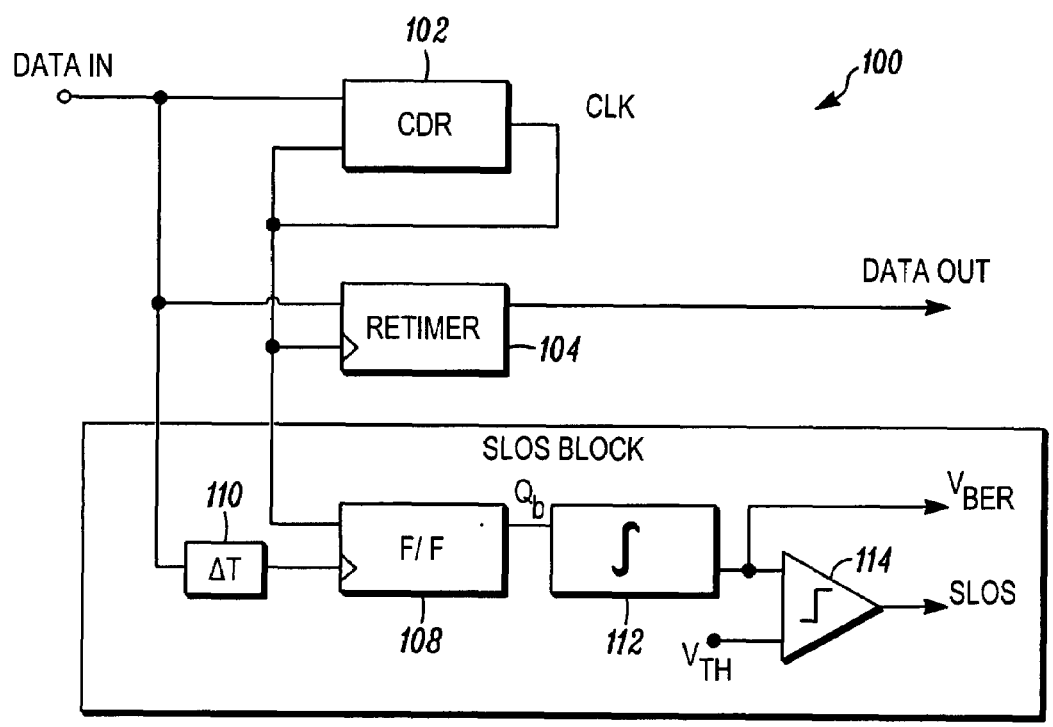
FIG. 1 is a simplified block diagram of a receiver including a statistical loss-of-signal detector according to an exemplary embodiment of the present invention.

The present invention provides a statistical loss of signal detector that minimizes the capacitive loading on the high speed data and clock lines. In one embodiment, the high-speed portion of SLOS detector according to the present invention includes one flip-flop and one buffer. Referring to FIG. 1, there is shown a partial block diagram of a receiver 100 according to an exemplary embodiment of the present invention. The incoming high speed data DataIn is applied to a clock and data recovery (CDR) block 102. CDR 102 extracts a clock signal CLK from the incoming data DataIn. A retimer block 104 receives the incoming data DataIn and adjusts the phase of DataIn using the extracted clock CLK. A SLOS detector 106 also receives the signals DataIn and CLK and generates signals $V_{BER}$ and SLOS. SLOS detector 106 includes a flip-flop (f/f) 108 that receives CLK at its data input and a delayed DataIn at its clock input. Signal DataIn is delayed by delay buffer 110. In one embodiment, delay buffer 110 delays data DataIn by one quarter of the CLK period or $\Delta T = T/4$. The output signal Qb of f/f 108 is averaged over time by integrator 112 to generate signal $V_{BER}$ that provides a measure of BER of the received signal. A comparator 114 compares $V_{BER}$ to a threshold voltage $V_{TH}$ to generate signal SLOS. As thus constructed, SLOS circuit 106 loads down the extracted clock CLK by a single f/f, and loads down the incoming data DataIn by a single buffer.

Figure 2:
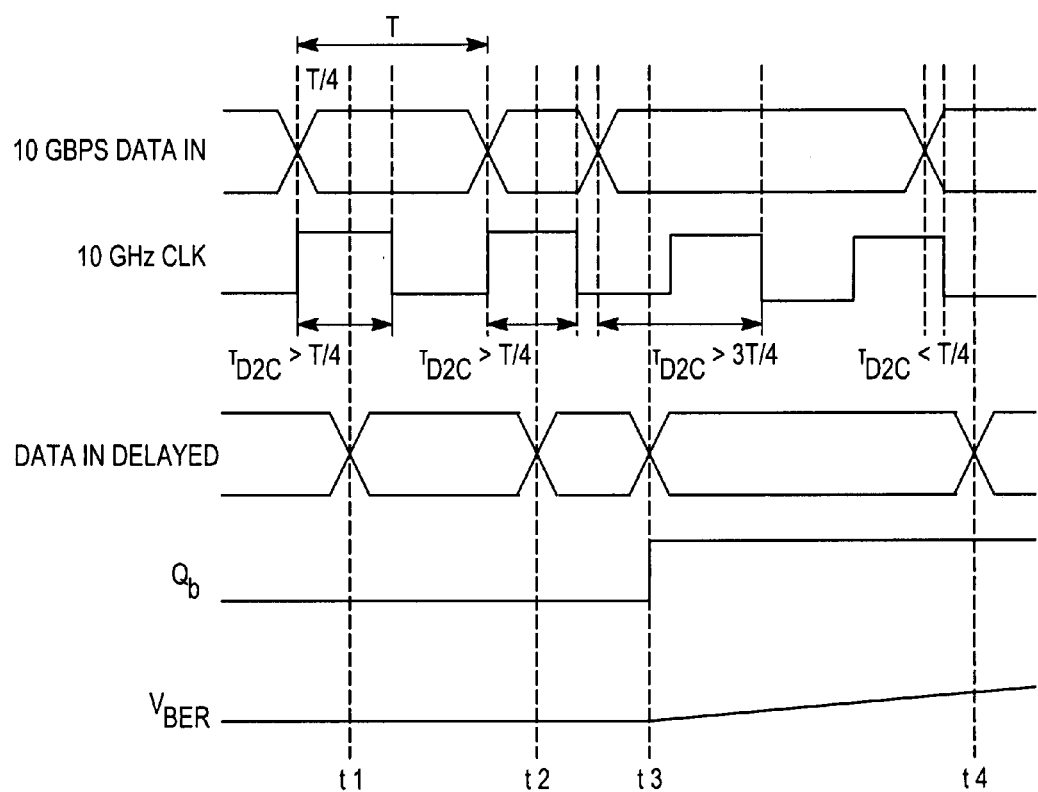
FIG. 2 is a timing diagram illustrating the operation of a SLOS detector according to an exemplary embodiment of the present invention.
Figure 3:
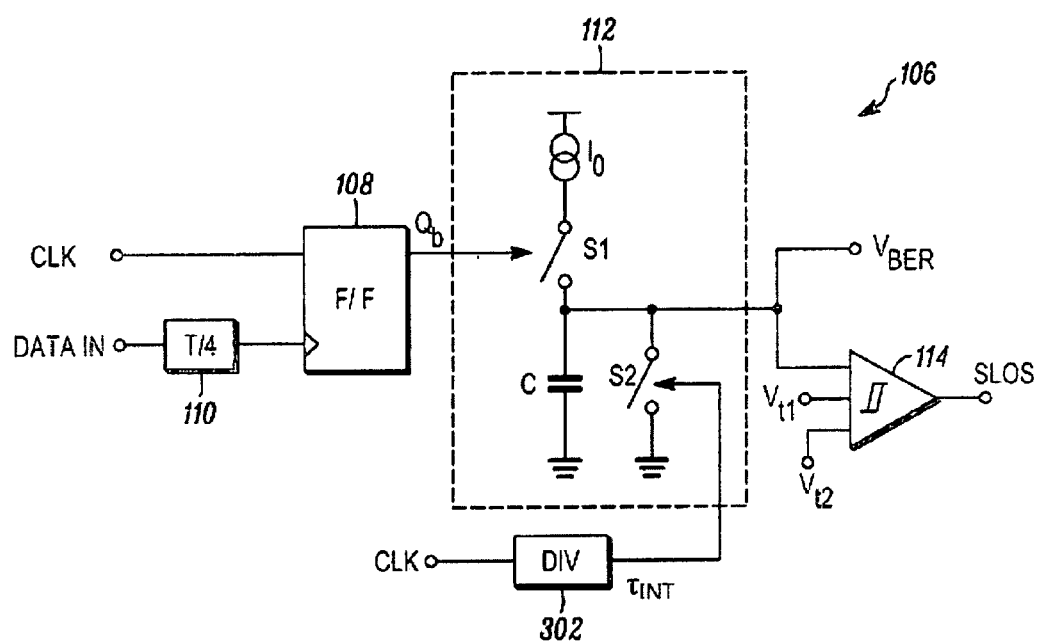
FIG. 3 shows an exemplary implementation for a SLOS detector according to the present invention.

The operation of the SLOS circuit will be described hereinafter in connection with the timing diagram shown in FIG. 2 and the exemplary SLOS circuit shown in FIG. 3. For illustrative purposes, an exemplary SONET OC-192 application will be assumed wherein the SLOS circuitry receives a 10 Gb/s incoming data and a 10 GHz extracted clock signal. It is to be understood, however, that the invention is not limited to any specific telecommunication standard. Referring to FIG. 2, the top two waveforms show DataIn and CLK signals. As noted therein, at 10 GHz, the clock period T equals 100 ps. Thus, in the exemplary embodiment where buffer 110 delays DataIn by T/4, the delay would be 25 ps. Referring to FIG. 3, f/f 108 latches the 10 GHz extracted clock signal CLK using the delayed data (signal DataIn_Delayed in FIG. 2). An error count occurs when an edge of the incoming data drifts past the allowed window $\Delta T$ on either side of the falling edge of CLK (when CLK falling edge is used to sample the data eye). That is, the SLOS circuitry needs to detect for both conditions $(T/2) \pm \Delta T$. Denoting the phase relationship between CLK and DataIn by $\tau_{D2C}$, the output of f/f 108, Qb, would depend on $\tau_{D2C}$. If $\tau_{D2C}$ is less than T/4 or larger than 3T/4, then Qb would be, e.g., high, otherwise it would be low as shown in FIG. 2. FIG. 2 illustrates all three cases; when $\tau_{D2C}$ is greater than T/4 ($\tau_{D2C} > T/4$; no error detected), when $\tau_{D2C}$ is larger than 3T/4 ($\tau_{D2C} > 3T/4$; error detected), and when $\tau_{D2C}$ is smaller than T/4 ($\tau_{D2C} < T/4$; error detected).

Referring to the example shown in FIG. 2, $\tau_{D2C}$ is defined by the time duration between a transition in DataIn and the next falling edge of CLK. The first transition on DataIn_Delayed at time t1 that clocks f/f 108 occurs at about the middle of the positive half-cycle of CLK. In this instance, the relationship $\tau_{D2C} > T/4$ clearly holds resulting in Qb being low (Qb is the complementary output of f/f 108). The same is true for the next transition of DataIn_Delayed at time t2 when f/f 108 latches a high value presented by CLK, resulting in Qb being low. Referring now to FIG. 3, there is shown an exemplary implementation for integrator 112 in greater detail. Integrator 112 includes a switch S1 that when closed connects a current source $I_0$ to a capacitor C. The top plate of capacitor C provides the signal $V_{BER}$ and connects to one input of comparator 114. Accordingly, as long as Qb remains low, switch S1 remains open and capacitor C remains discharged, maintaining a low state for $V_{BER}$.

The next transition of signal DataIn_Delayed occurs at time t3 earlier than expected due to, e.g., jitter. As shown in FIG. 2, this causes $\tau_{D2C}$ to be greater than 3T/4 such that a low state of CLK (at t3) is latched by f/f 108. Thus Qb goes high closing switch S1 and allowing current source $I_0$ to charge up capacitor C. Therefore, at time t3, Qb signals an error and $V_{BER}$ starts to rise. The following transition of DataIn_Delayed occurs later than expected at time t4. In this instance $\tau_{D2C}$ is smaller than T/4 as shown in FIG. 2. A low state of CLK (at t4) is latched by f/f 108 keeping Qb high and switch S1 closed. Current source $I_0$ continues to charge capacitor C. Thus, another error is detected resulting in further increase in the level of VBER. Accordingly, in this embodiment, a delay of T/4 allows for examining both criteria $\tau_{D2C}$<T/4 and $\tau_{D2C}$>3T/4 with one flip-flop. This minimizes the capacitive loading on the high-speed signal path. The present invention thus selects a $\Delta T$ such that it results in a symmetrical window around the sampling edge of CLK and is therefore able to detect both conditions (T/2)±$\Delta T$ with a single flip-flop.

Returning to the operation of the SLOS circuit, each time Qb goes high, current source $I_0$ charges up capacitor C and voltage $V_{BER}$ increases. When Qb is low, however, capacitor C maintains its charge and $V_{BER}$ stays constant. A second switch S2 connecting in parallel to capacitor C resets the integrator after a predetermined amount of time $\tau$int. The value of the integration period $\tau$int is dictated primarily by the target BER, and may be generated by a divider circuit 302 that divides down the clock signal CLK to arrive at the target period (e.g., 50 µs). Comparator 114 compares $V_{BER}$ to a predetermined threshold voltage and generates the signal SLOS. In one embodiment, comparator 114 has a built-in hysteresis which requires $V_{BER}$ to exceed a first threshold Vt1 to signal a loss-of-signal condition (e.g., SLOS=high), and then to drop below a second threshold Vt2 that is smaller than Vt1 before SLOS goes low again. This will allow the circuit to signal an alarm when the BER reaches, e.g., $10^{-3}$ (one error in 1 kilo bits of data), and to not release the alarm until BER drops to $10^{-4}$ (one error in 10 kilo bits of data). The values of Vt1 and Vt2 are determined by the size of $\Delta T$ (e.g., T/3 or T/4), the set-up and hold time of retimer circuitry (FIG. 1), and the expected noise shape (e.g., Gaussian). In an exemplary embodiment, Vt1 is set at approximately 800 mV and Vt2 is set at approximately 600 mV. A specific exemplary implementation for comparator 114 will be further described below in connection with FIG. 6.

As incoming data noise increases (BER increases), the number of times that $\tau_{D2C}$ falls outside of (T/2)±$\Delta T$ increases. As a result, capacitor C is charged more often and $V_{BER}$ increases. The slope of this relationship between BER and $V_{BER}$ can be adjusted by changing the value of C, or alternatively by changing the amount of current supplied by current source $I_0$. In one embodiment capacitor C is provided external to the chip, allowing the user to increase the value of C which would lead to smaller $V_{BER}$, and hence, a higher BER required to trigger SLOS. The value of C can be adjusted by the user to match an expected noise shape as well.

Figure 4:
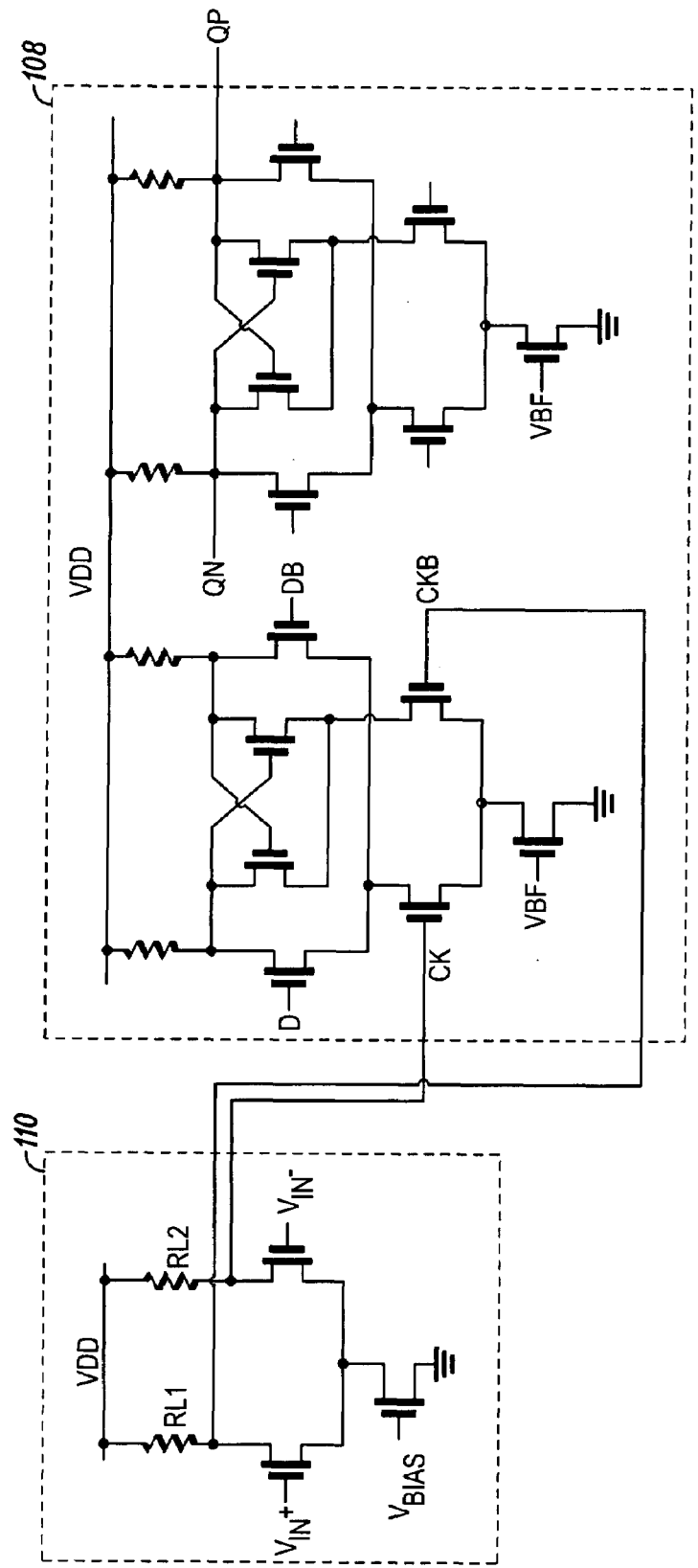
FIG. 4 shows exemplary transistor-level implementations for high speed delay circuit and flip-flop used in the SLOS detector of the present invention.

It is desirable to implement the SLOS circuitry in standard CMOS process technology. Referring to FIG. 4, there is shown an exemplary circuit implementation for delay buffer 110 and flip-flop 108 using standard CMOS process technology. To achieve the higher speed of operation, this exemplary embodiment uses a circuit technique based on current-steering referred to as current-controlled CMOS or $C^3MOS^{TM}$ logic. Buffer 110 is implemented by a differential pair that steers current in one of two branches in response to the differential signal at its inputs. Flip-flop 108 is constructed in an analogous manner. These circuits operate much faster as they need not incur the delay caused by turning transistors on and off to signal a logic state, and instead steer current from one branch to another. There is a power penalty since the circuit draws steady-state current. However, it is capable of realizing speeds that would otherwise not be achievable by standard CMOS logic. A more detailed description of various circuit blocks implemented in $C^3MOS$ logic including buffers, flip-flops and other logic circuits is provided in commonly-assigned patent application Ser. No. 09/484,856,entitled "Current-Controlled CMOS Logic Family," by A. Hairapetian, which is hereby incorporated by reference.

Figure 5:
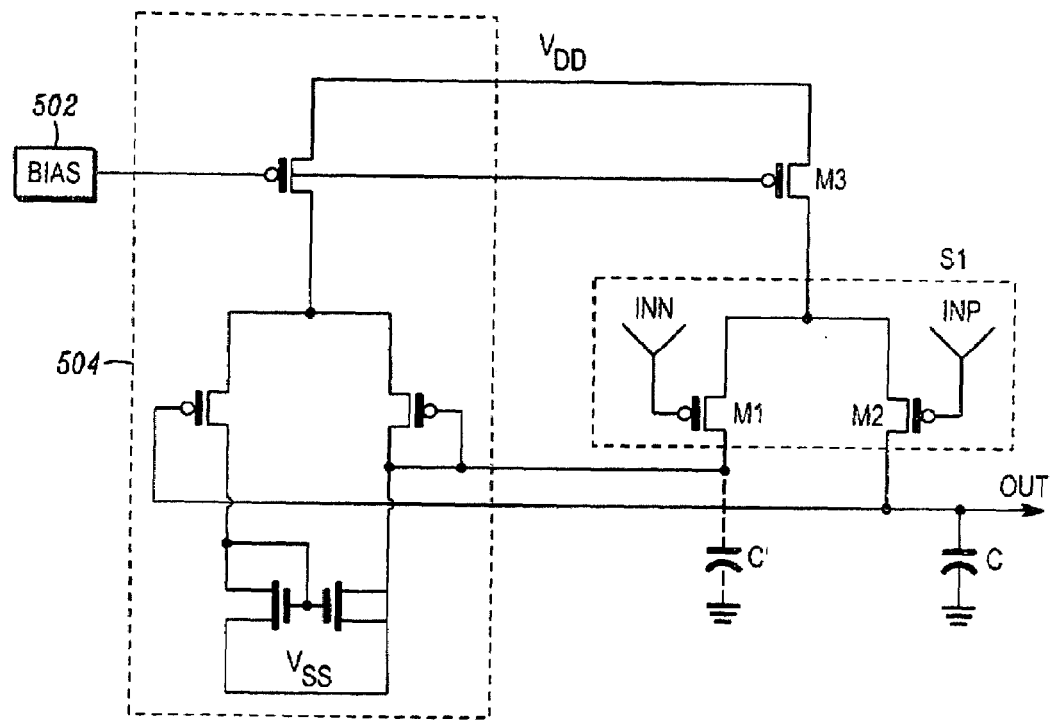
FIG. 5 is a circuit schematic of an exemplary analog integrator for use in the SLOS detector of the present invention.

FIG. 5 provides an exemplary transistor-level circuit diagram for integrator 112 using standard CMOS process technology. While a single transistor can be used to implement switch S1, according to this embodiment of the invention, a faster differential implementation is preferred. Switch S1 is implemented by a pair of transistors M1 and M2. In this embodiment, transistors M1 and M2 are p-channel transistors. It is to be understood, however, that this circuit can be implemented with transistors having the opposite polarity. The gate terminals of transistors M1 and M2 receive the output of the flip-flop (f/f 108 in FIG. 1) and its complement. Transistor M3 receives a bias voltage at its gate from bias circuit 502 and supplies current to transistors M1 and M2. Therefore, at any given time, one of the transistors M1 or M2 is conducting current depending on the logic state applied to the inputs INN and INP. Since the current source need not turn on and off, this differential implementation realizes a higher speed switching operation. Transistor M2 connects to capacitor C while transistor M1 connects to a dummy capacitor C'. A unity gain buffer amplifier 504 connects between the two branches of the differential switch to maintain the voltage at the two nodes as close together as possible. This maximizes the switching speed of the circuit. It is to be understood that the specific implementation shown in FIG. 5 is for illustrative purposes and that other implementations are possible. For example, instead of using an analog integrator of the type shown in FIG. 5, the SLOS circuitry of the present invention may use a digital integrator where, for example, a counter counts the number of times Qb is asserted.

Figure 6:
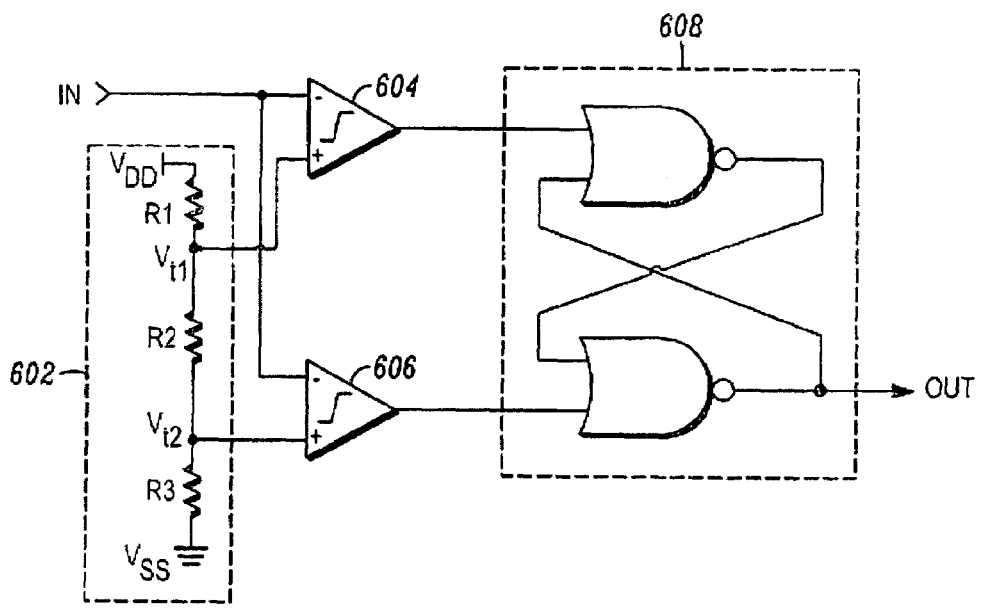
FIG. 6 shows a transistor-level implementation for an exemplary comparator for use in the SLOS detector of the present invention.

A number of different implementations are possible for comparator 114. FIG. 6 shows one exemplary implementation. In this example, the two threshold voltages Vt1 and Vt2 are set by a resistive divider chain 602. A first conventional comparator 604 receives Vt1 at its positive input and $V_{BER}$ at its negative input (IN). A second conventional comparator 606 receives Vt2 at its positive input and $V_{BER}$ at its negative input. Comparators 604 and 606 need not have special high speed implementation since this part of the circuit operates at lower speed. Well known comparator circuitry can be used to implement comparators 604 and 606. The output of comparators 604 and 606 respectively connect to inputs of a set-reset latch 608. Set-reset latch 608 is implemented by a pair of cross-coupled NOR gates as shown. Other types of compare circuitry with built-in hysteresis will be know to those skilled in this art.

In conclusion, the present invention provides methods and circuitry for implementing a high speed statistical loss-of-signal detector. The invention minimizes the amount of capacitive loading the SLOS circuitry introduces on high speed signal lines of a receiver. In specific embodiments, the invention provides high speed SLOS circuitry using standard CMOS technology. It is to be understood that the specific embodiments described above are for illustrative purposes only, and that various modifications, alternative implementations and equivalents are possible. For example, integration duration τint, as well as specific voltage levels Vt1 and Vt2 may vary depending on the application requirements such as target BER, noise distribution, etc. Similarly, specific transistor-level implementations are intended for illustrative purposes only and are not limiting. The scope of the invention should therefore not be limited by the embodiment described above, and should instead be determined by the following claims and their full breadth of equivalents.

What is claimed is:

1. In a receiver that includes a clock recovery circuit for extracting a recovered clock signal from an incoming data signal, a loss-of-signal detector comprising:
   a delay circuit coupled to receive the incoming data signal and configured to shift a phase of the incoming data signal by a predetermined delay ΔT to generate a delayed data signal;
   a flip-flop coupled to receive the recovered clock signal at one input and the delayed data signal at a second input;
   an integrator coupled to an output of the flip-flop, wherein the integrator is configured to integrate a plurality of error signals generated by the flip-flop for an integration period, τint, and to generate a bit error rate sign, $V_{BER}$;
   a switch coupled to the integrator and configured to reset the integrator; and
   a comparator having a first input coupled to an output of the integrator and a second input coupled to a threshold voltage, wherein the comparator is configured to compare $V_{BER}$ to a threshold level and to generate a loss-of-signal indicator when $V_{BER}$ exceeds the threshold level,
   wherein, the delay circuit is configured to shift the phase of the incoming data signal in a manner that is symmetrical with respect to a sampling edge of the clock signal;
   wherein the flip-flop is configured to generate an error signal when a transition of the delayed data signal falls outside the range (T/2)±ΔT, where T is the period of the recovered clock signal,
   and wherein the comparator comprises a hysteresis whereby the loss-of-signal indicator is asserted when $V_{BER}$ exceeds a first threshold Vt1, and is not cleared until $V_{BER}$ drops below a second threshold Vt2 that is lower than the first threshold Vt1.

2. The loss-of-signal detector of claim 1 wherein the predetermined delay ΔT is substantially equal to about ¼ of the recovered clock signal period T.

3. The loss-of-signal detector of claim 1 wherein the delay circuit comprises a buffer implemented in current-controlled complementary metal-oxide-semiconductor ($C^3MOS$) logic.

4. The loss-of signal detector of claim 3 wherein the flip-flop is implemented in $C^3MOS$ logic.

5. The loss-of signal detector of claim 1 wherein the integrator comprises:
   a current source configured to supply $I_0$;
   a capacitor; and
   a first switch coupled between the current source and the capacitor, and configured to open or close in response to the error signal generated by the flip-flop.

6. The loss-of-signal detector of claim 5 wherein the integrator further comprises a second switch coupled in parallel to the capacitor and configured to discharge the capacitor in response at the end of each integration period τint.

7. The loss-of-signal detector of claim 5 wherein the first switch of the integrator comprises a pair of differentially coupled metal-oxide-semiconductor field effect transistors (MOSFETs).

8. The loss-of-signal detector of claim 7 wherein the pair of MOSFETs are a p-channel type.

9. The loss-of-signal detector of claim 7 wherein the integrator further comprises a unity-gain buffer coupled between the pair of differentially coupled MOSFETS.

10. In a receiver that includes a clock recovery circuit for extracting a recovered clock signal from an incoming data signal, a loss-of-signal detector comprising:
    a delay circuit coupled to receive the incoming data signal and configured to shift a phase of the incoming data signal by a predetermined delay ΔT to generate a delayed data signal;
    a flip-flop coupled to receive the recovered clock signal at one input and the delayed data signal at a second input;
    an integrator coupled to an output of the flip-flop, wherein the integrator includes:
       a current source;
       a capacitor configured to be charged by the current source; and
       a first switch coupled between the current source and the capacitor, and configured to open or close in response to the error signal generated by the flip-flop,
       a second switch coupled in parallel to the capacitor and configured to discharge the capacitor in response at the end of each integration period τint,
       and wherein the integrator is configured to integrate a plurality of error signals generated by the flip-flop for an integration period, τint, and to generate a bit error rate signal, $V_{BER}$;
    a divider circuit coupled to receive the recovered clock signal and configured to generate a signal representing the integration period τint;
    a switch coupled to the integrator and configured to reset the integrator; and
    a comparator having a first input coupled to an output of the integrator and a second input coupled to a threshold voltage,
    wherein, the delay circuit is configured to shift the phase of the incoming data signal in a manner that is symmetrical with respect to a sampling edge of the clock signal;
    wherein the flip-flop is configured to generate an error signal when a transition of the delayed data signal falls outside the range (T/2)±ΔT, where T is the period of the recovered clock signal.

* * * * *